United States Patent [19]

Abe

[11] Patent Number: 4,829,499
[45] Date of Patent: May 9, 1989

[54] PROCESSING OF A DETECTION SIGNAL OBTAINED BY SCANNING AN OPTICAL DISK

[75] Inventor: Michiharu Abe, Yokohama, Japan

[73] Assignee: Ricoh Company, Ltd., Tokyo, Japan

[21] Appl. No.: 43,322

[22] Filed: Apr. 28, 1987

[30] Foreign Application Priority Data

Apr. 30, 1986 [JP] Japan ................... 61-100390

[51] Int. Cl.$^4$ ............................................. G11B 27/36
[52] U.S. Cl. ........................................ 369/59; 360/67; 360/65
[58] Field of Search ............... 369/59; 360/67, 43, 360/46, 65

[56] References Cited

U.S. PATENT DOCUMENTS

| | | | |
|---|---|---|---|
| 4,371,900 | 2/1983 | Huber | 360/46 |
| 4,399,474 | 8/1983 | Coleman, Jr. | 360/46 |
| 4,499,570 | 2/1985 | Schouhamer Immick et al. | 369/59 |

Primary Examiner—Aristotelis M. Psitos
Assistant Examiner—Kevin J. Fournier
Attorney, Agent, or Firm—Cooper & Dunham

[57] ABSTRACT

An information signal reconstructing method and apparatus for use in an optical disk system is provided. Data stored on an optical disk in a binary format is optically scanned by a photodetector to provide a detection signal. The average of this detection signal is first determined and then, using the thus determined average, the detection signal is subjected to an amplitude limiting operation so that there is obtained an output signal as an information signal reflecting the binary information of the data stored on the optical disk. During the amplitude limiting operation, the signal is so processed to have the same positive and negative amplitudes with respect to the average which is set at a zero level.

6 Claims, 2 Drawing Sheets

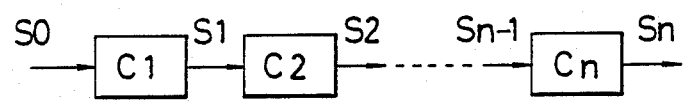
FIG. 1a
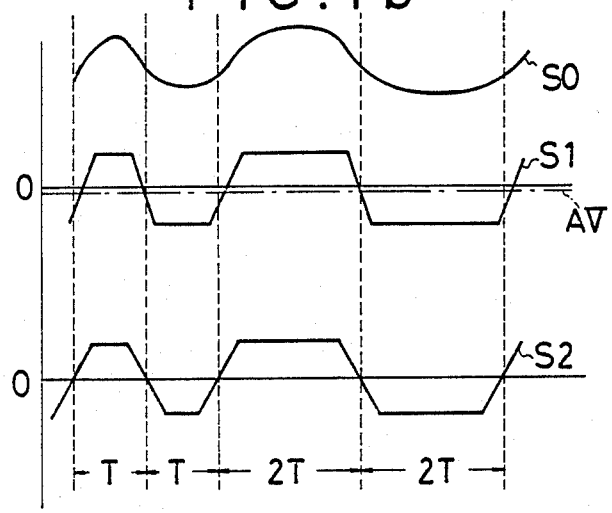
FIG. 1b
FIG. 2
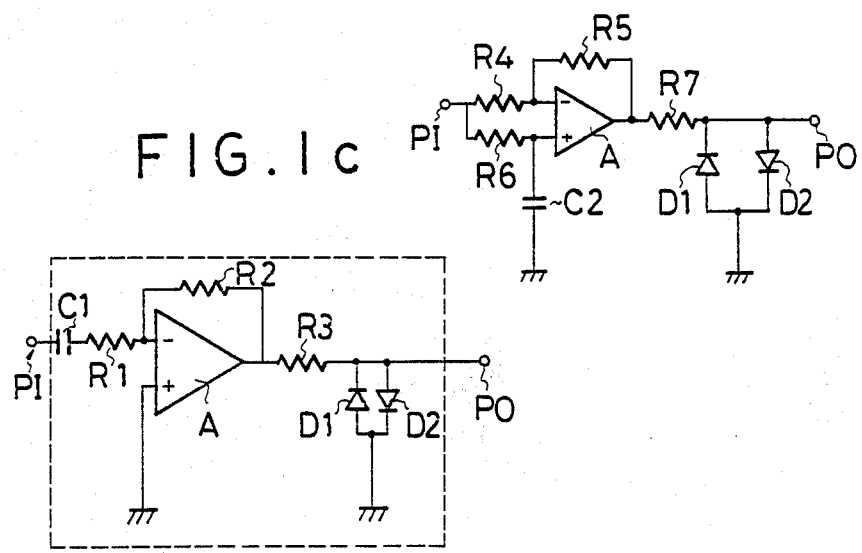
FIG. 1c

PROCESSING OF A DETECTION SIGNAL OBTAINED BY SCANNING AN OPTICAL DISK

BACKGROUND OF THE INVENTION

1. Field of the Invention

This invention generally relates to an information recording and reproducing technology, such as an optical recording and reproducing system, and, in particular, to a system and method for reconstructing an information signal from the data recorded on a recording medium, such as an optical disk.

2. Description of the Prior Art

An optical disk system is well known in the art. In an optical disk system, data is recorded along an information track of an optical recording medium in the form of alternative positive and negative binary marks limited in length during a recording mode of operation. On the other hand, during a reproducing mode of operation, the information track of the optical recording medium is optically scanned by a light beam and the light intensity of the light reflecting from the optical recording medium or of the light transmitted through the optical recording medium is detected by a photodetector, whereby the detected light intensity is used to reconstruct an information signal.

Referring to FIG. 3a, there is schematically shown an example of a series of marks formed on an optical recording medium, such as an optical disk. As shown, a series of marks is arranged along an information track 10 which is typically defined on the surface of an optical disk spirally or circularly. The marks formed along the information track 10 include pits 12 and spaces 14 which are arranged alternatively. Each of the pits 12 is typically defined as a recess formed on the surface of an optical disk; on the other hand, each of the spaces 14 is defined as a spacing between the two adjacent pits 12. Typically, the length of each of the pit 12 and space 14 is limited to a predetermined value depending on a particular mode of modulation used, so that the pits 12 and spaces 14 each have a predetermined unit length in the direction along the information track 10. In FIG. 3a, there are shown pits 12 having a predetermined unit length and also a pit 12 having twice of the unit length. Similarly, there are also shown spaces 14 having a predetermined unit length and also a space 14 having twice of the unit length.

FIGS. 3b through 3d each graphically shows a detection signal which is obtained by scanning the marks comprised of pits and spaces formed on an optical system by scanning with a light beam and detecting the intensity or level of the light either reflecting from or transmitted through the optical disk. FIG. 3b shows a detection signal obtained from an optical disk on which pits and spaces are properly formed. In this case, if the average level of the detection signal is taken to be 0, then the length of pit $T_p$ defined between two adjacent zero-crossing points and the length of space $T_s$ defined between two adjacent zero-crossing points are both equal to T, and, thus, there is no discrepancy (so-called asymmetry) in length between the pits and spaces defined on the optical disk.

Incidentally, when the marks are formed on an optical recording medium, use is typically made of a laser beam. In this case, however, because of various reasons, such as fluctuations in intensity of a laser beam during a recording mode of operation, deformation, such as warping, of an optical recording medium, focus distortions, tolerances in the thickness of a substrate of an optical recording medium, aging of a recording medium, and stains of an optical system and an optical recording medium, there can be difference in recorded conditions as much as twice the power of a laser beam for use in recording. If the recording condition is above a proper recording condition, there is obtained a detection signal as shown in FIG. 3c, whereby $T_p$ and $T_s$ are not equal to T and $T_p$ is smaller than $T_s$. On the other hand, if the recording condition is below the proper recording condition, there is obtained a detection signal as shown in FIG. 3d, whereby $T_p$ and $T_s$ are not equal to T and $T_p$ is larger than $T_s$.

As described above, the occurrence of deviations of the actual recording condition from the proper recording condition during a recording mode of operation, in which data is recorded onto an optical recording medium, is unavoidable, and the occurrence of such deviations causes $T_p$ to be unequal to $T_s$, thereby bringing about the before-mentioned problem of asymmetry. In particular, in the case of high density recording, such as 25,400 bits or more per inch, the shifting of bit position due to asymmetry, i.e., a deviation of bit timing from the intended timing, becomes larger, thereby presenting a practically grave problem.

As disclosed in the U.S. Pat. No. 4,142,208, which is hereby incorporated by reference, it has been proposed to maintain the duty of the output of a binary signal at 50% by detecting the duty ratio after converting a detection signal into a binary signal and feeding back a difference signal from the duty ratio of 50% to the input of a binary converting circuit. In this case, however, there still remains difficulty in adjustment of the feed-back circuit which is rather unstable and tends to oscillate. And yet, if the feed-back circuit is stabilized, then the advantages of providing such a feed-back circuit are significantly reduced.

SUMMARY OF THE INVENTION

In accordance with the present invention, a detection signal is obtained by optically scanning an optical recording medium, and an average level of the detection signal is determined, thereby limiting the amplitude of the detection signal based on the thus determined average level.

It is therefore a primary object of the present invention to obviate the disadvantages of the prior art as described above and to provide an improved method and system of reconstructing an information signal from an optical recording medium.

Another object of the present invention is to provide an improved method and system for reconstructing an information signal, which can mitigate or eliminate the adverse effects due to bit position shifting due to asymmetry.

A further object of the present invention is to provide an improved method and system for reconstructing an information signal at high accuracy at all times.

A still further object of the present invention is to provide an improved optical disk recording and reproducing method and system having high reliability and stability in operation and a reduced cost.

Other objects, advantages and novel features of the present invention will become apparent from the following detailed description of the invention when considered in conjunction with the accompanying drawings.

BRIEF DESCRIPTION OF THE DRAWINGS

FIG. 1a is a block diagram showing an image information reconstructing system constructed in accordance with one embodiment of the present invention;

FIG. 1b is a graph which is useful for understanding the operation of the structure shown in FIG. 1a;

FIG. 1c is a circuit diagram showing one example of an amplitude limiting circuit which can be applied to the present invention advantageously;

FIG. 2 is a circuit diagram showing another example of the amplitude limiting circuit applicable to the present invention;

DESCRIPTION OF THE PREFERRED EMBODIMENTS

Figure 3A:
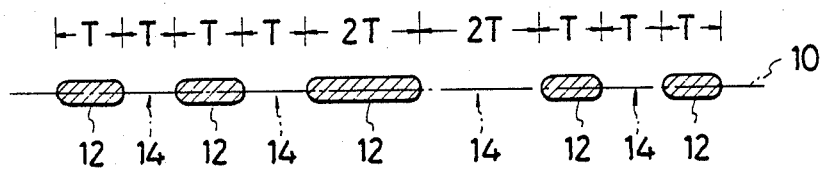
FIG. 3a is a schematic illustration showing a series of pits 12 and spaces 14 arranged alternatively along the record track 10 of an optical disk.
Figure 3B:
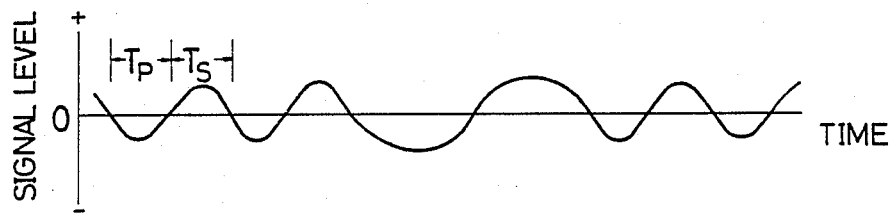
FIGS. 3b through 3d are graphs which are useful for understanding the problems associated with the technique of recording data on an optical disk using a laser beam.
Figure 3C:
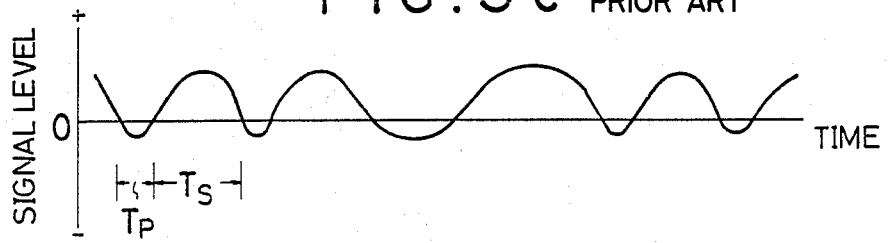
Figure 3D:
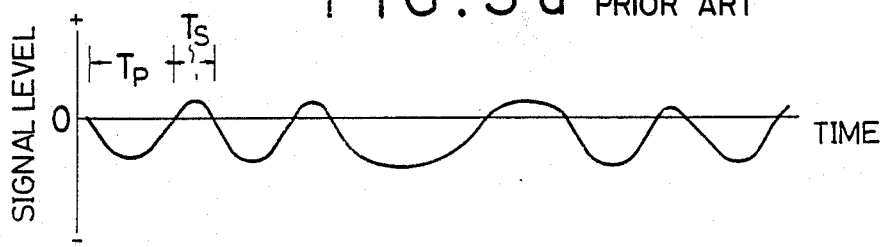

The present invention is applicable to various types of optical recording and reproducing methods and systems. However, the present invention will be described here regarding the case in which it is applied to an optical disk system. In accordance with the principle of the present invention, data recored on an optical recording medium in the form of negative and positive marks limited in length and arranged alternatively along an information track is optically scanned by a light beam, such as laser beam, and the light beam either reflecting from or transmitted through the optical recording medium is received by a photodetector to obtain a detection signal, which is then suitably processed to produce an information signal. That is, the average level of the detection signal is determined and the detection signal is processed to limit its amplitude between upper and lower limits which are determined on the basis of the average level.

Now, referring to FIG. 1a, there is shown in block form a plurality of series-connected amplitude limiting circuits for use in limiting the amplitude of the detection signal obtained by optically scanning an optical recording medium. In FIG. 1a, there are provided n plurality of amplitude limiting circuits C1, C2, . . . , and Cn connected in series. Each of these n number of amplitude limiting circuits C1 through Cn has an identical structure, and, for example, may have a structure shown in FIG. 1c. The amplitude limiting circuit shown in FIG. 1c includes an operational amplifier A which has its inverting input terminal connected to a circuit input terminal PI through a resistor R1 and a capacitor C1 which are connected serially and its non-inverting input terminal connected to ground. The output terminal of the operational amplifier A is connected to the inverting input terminal via a feed-back resistor R2 and also to a circuit output terminal PO through a resistor R3. In addition, a pair of diodes D1 and D2, which are connected in parallel in reversed directions, is connected between the junction between the resistor R3 and the circuit output terminal PO and ground.

With this structure shown in FIG. 1c, when an input signal is applied to the circuit input terminal PI, this input signal is first passed through a high pass filter comprised of capacitor C1 and resistor R1 and having the time constant of C1·R1, and then is amplified as being inverted by the operational amplifier A with the gain of R2/R1. And, the amplified signal obtained at the output terminal of the operational amplifier A is limited in amplitude by a combination of resistor R3 and diodes D1 and D2. In this case, the ground level is used as an average level and the output signal from the operational amplifier A is limited in upper and lower levels such that the difference between the upper level and the average level is equal to or substantially equal to the difference between the average and the lower level in magnitude. The output signal thus regulated or limited in upper and lower amplitudes is then obtained at the output terminal PO.

Returning to FIG. 1a, the detection signal S0 supplied from the photodetector which receives the light beam reflecting from or transmitted through an optical recording medium on which data is recorded in a binary format is first supplied to a first amplitude limiting circuit C1 which outputs an amplitude-limited signal S1. Similarly, this signal S1 is input into a second amplitude limiting circuit C2 which is identical in structure to the first amplitude limiting circuit C1, so that there is obtained another amplitude-limited signal S2. In this manner, the signal is subjected to an amplitude limiting process repetitively by passing through each of the series-connected amplitude limiting circuits one after another, and, then, the n times amplitude-limited signal Sn is output from the nth amplitude limiting circuit Cn as an information signal.

Suppose that the detection signal S0 obtained from a photodetector which receives the light reflecting from or transmitting through an optical recording medium is of the form shown in FIG. 1b. This detection signal S0 contains a d.c. component as well as an a.c. component. When this detection signal S0 is passed through the amplitude limiting circuit C1, there is obtained an amplitude-limited signal S1 which has its zero level corresponding to the average level of the detection signal and which has its upper and lower levels limited such that the positive and negative amplitudes are same in magnitude. The so-called asymmetry is present in this amplitude-limited signal S1, so that the length of each of pit and space may become longer or shorter than predetermined lengths T and 2T. It is to be noted that, because of the inversion amplification function provided by the amplitude limiting circuit shown in FIG. 1c, the processed signal S1, in reality, is an inverted signal of the signal shown in FIG. 1b. However, here, for the sake of easiness in understanding, the processed signal S1 is shown as non-inverted in FIG. 1b.

The processed signal S1 is then supplied to the second amplitude limiting circuit C2. The output signal S2 from the second amplitude limiting circuit C2 is obtained by detecting the average level AV of the first processed signal S1 and limiting the amplitude of the first processed signal S1 using this average level AV as a zero level such that the resulting output signal S2 has the same positive and negative amplitudes. As a result, the average level is shifted so as to reduce the level of asymmetry. As the number of processing through an amplitude limiting circuit increases, the average level is renewed so as to reduce the level of asymmetry, so that the level of asymmetry is successively reduced as the amplitude limiting operation is carried out repetitively. It is true that the larger the number of repetitions of amplitude limiting operations, the larger the effect of reducing the level of asymmetry. However, from a practical viewpoint, it is also true that there may be a case in which the implementation of amplitude limiting operation only once is sufficient to obtain a sufficiently reduced asymmetry. Accordingly, the number of provision of amplitude limiting circuits may be determined arbitrarily as desired.

A specific example of the present invention will now be described. Using an optical disk as an optical recording medium, data has been recorded in the form of pits and spaces in accordance with the $M^2$ code modulation system with the minimum pit length=minimum space length=t=0.96 microns. The optical disk contained a recording film comprised of a light absorbing and reflecting dye material (cyanine), and the line speed (linear velocity) during recording and reproducing was 1.2 meters/sec. The wavelength of the laser beam used was 790 nm (semiconductor laser) and the NA of a condenser lens used was 0.47. The magnitude of bit shifting was measured at the 200th bit position from the leading edge of a sector and the measured results are tabulated in the following table in terms of %. It is to be noted that the width of a reference window of 0.48 microns was taken as 100% in determining the magnitude of bit shifting. In addition, in the following table, "PW" indicates the power of a laser beam used during recording mode of operation.

TABLE

| | Magnitude of Bit Shifting | | |
|---|---|---|---|
| | PW = 1.5 mW | PW = 2.2 mW | PW = 3.2 mW |
| Signal S3 | 55% | 30% | 35% |
| Signal S2 | 60% | 30% | 40% |
| Signal S1 | 70% | 30% | 55% |
| Signal SX | 65% | 30% | 50% |

It should be noted that the Signal S2 defines an information signal which is obtained by processing the detection signal S0 through a pair of amplitude limiting circuits which are connected in series and each of which is structured as shown in FIG. 1c. Similarly, the signal S3 defines an information signal which may be obtained by passing the detection signal S0 through three amplitude limiting circuits C1 through C3 connected in series and having an identical structure as shown in FIG. 1c. On the other hand, the signal S1 is an information signal which is obtained at the output terminal of the single amplitude limiting circuit C1 when the detection signal S0 is passed therethrough. Moreover, the signal SX is an information signal which can be obtained according to the method disclosed in the before-mentioned U.S. Pat. No. 4,142,208.

It can be seen from the above table that the signal S1 is relatively large in the magnitude of bit shifting due to fluctuations in the power of a laser beam during a recording mode of operation. In addition, in the case of the signal SX, there is almost no effect in the vicinity of the leading edge of a sector.

It is to be noted that the gain of the operational amplifier A (=R2/R1) should be set in a range between 1 and 100, preferably in a range between 1.5 and 10. If so set, even if the input signal varies in level twice to 10 times, the correction of asymmetry can be carried out securely, so that a margin for the level of an input signal can be broadened. In the example described and tabulated above, the gain of the operational amplifier A has been set at 2.5; however, it is to be noted that the similar results can be obtained even if the gain is set at 5.

FIG. 2 shows an alternative example of an amplitude limiting circuit which can be used in the present invention advantageously. As shown, the amplitude limiting circuit shown in FIG. 2 is structurally similar in many respects to the circuit shown in FIG. 1c. The structural difference resides in the resistance values of the resistors R4 through R7 used and the manner of provision of a capacitor C2. That is, in the circuit shown in FIG. 2, the capacitor C2 is connected between the non-inverting input terminal of the operational amplifier A and ground and the resistor R6 is connected between the non-inverting input terminal of the operational amplifier A and the circuit input terminal PI with the resistor R4 being connected between the inverting input terminal of the operational amplifier A and the circuit input terminal PI.

As described above, in accordance with the principle of the present invention, the so-called asymmetry can be advantageously reduced by a particular processing involving averaging and amplitude limiting operations, thereby allowing to reconstruct a proper information signal. The present method can be implemented with an amplitude limiting circuit having a simple structure, so that the present invention can be implemented at low cost and high reliability. In addition, the present invention also allows to reconstruct an information signal securely even at the leading edge of a sector where the fluctuations in signal level is at maximum. It should also be noted that the present invention may also be advantageously used in combination with a circuit for correcting an amplitude and/or phase, e.g., a circuit disclosed in the Japanese Patent Laid-Open Publication No. 60-107736, which is hereby incorporated by reference, or with a delay and equalizing circuit or the like. Furthermore, the present invention is particularly useful for reconstructing an information (original) signal which has been recorded after processing to obtain the duty ratio of 50%, for example, by FM modulation, $M^2$ modulation, EFM modulation, and the like.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. Apparatus for processing a detection signal obtained by scanning an optical recording medium on which data is recorded in a binary format to reconstruct an information signal, comprising:
   first means for receiving said detection signal and determining an average of said detection signal; and
   second means for limiting the amplitude of said detection signal using said average thus determined as a reference, said second means providing an output signal, which is an amplitude-limited signal of said detection signal, as said information signal;
   wherein said first means includes an operational amplifier having a first input terminal connected to receive said detection signal, a second input terminal connected to a reference voltage, and an output terminal connected to said second means.

2. Apparatus of claim 1 wherein said reference voltage is ground.

3. Apparatus of claim 2 wherein said first input terminal is a non-inverting input terminal of said operational amplifier and said second input terminal is an inverting input terminal of said operational amplifier.

4. Apparatus of claim 1 wherein said second means includes a pair of diodes connected in parallel in reversed directions.

5. Apparatus of claim 1 further comprising:
third means for receiving said output signal from said second means and determining an average of said output signal from said second means; and fourth means for limiting the amplitude of said output signal from said second means using said average thus determined for said output signal as a reference, said fourth means providing another output signal, which is an amplitude-limited signal of said output signal from said second means, as said information signal.

6. Apparatus of claim 5 wherein a combination of said first and second means is equal in structure to a combination of said third and fourth means.

* * * * *